INVENTORS
NORMAN H. HORWITZ
JAMES E. LOFSTROM
BY
*Burton E Parker*
ATTORNEYS

Nov. 19, 1968   N. H. HORWITZ ET AL   3,412,246
SPARK IMAGING DEVICE FOR MAPPING DISTRIBUTION OF RADIATION
Filed April 2, 1965   3 Sheets-Sheet 2
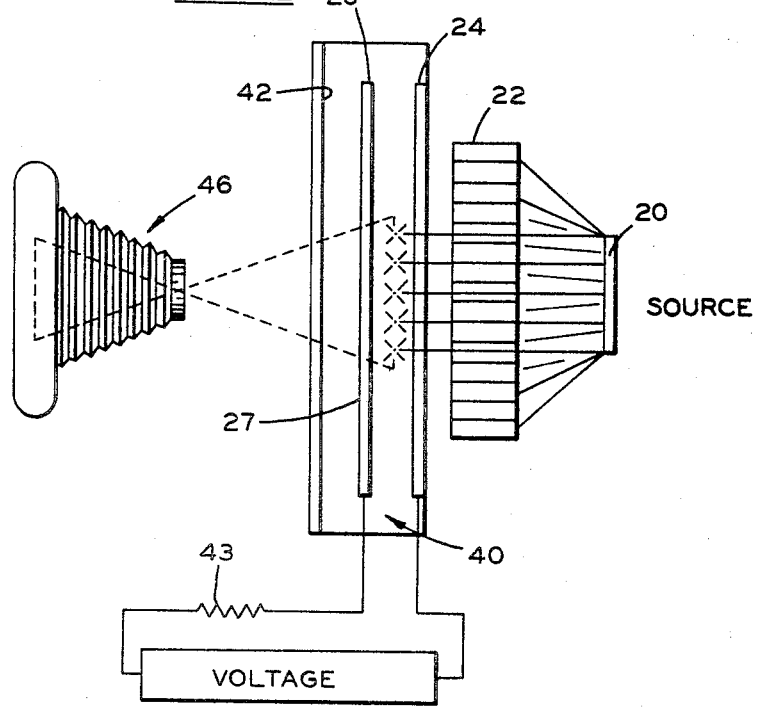
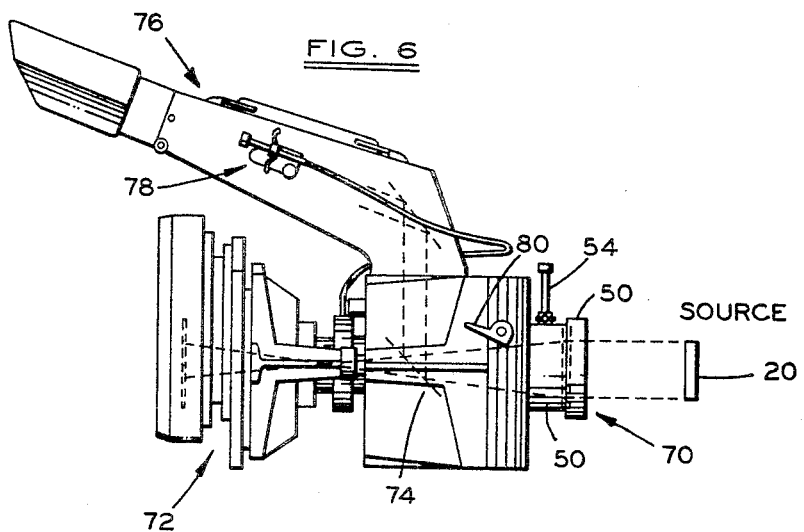
INVENTORS
NORMAN H. HORWITZ
JAMES E. LOFSTROM
BY
Burton & Parker
ATTORNEYS

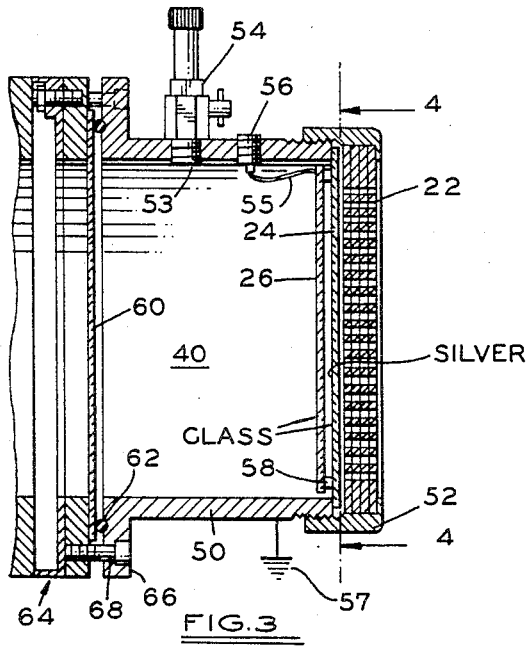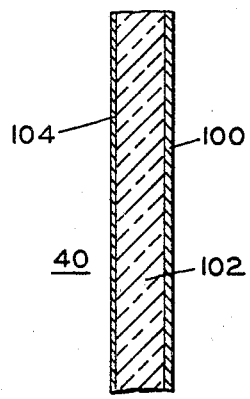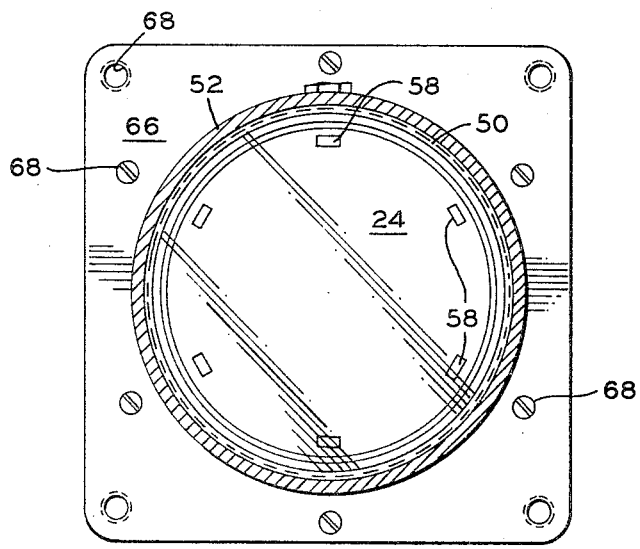

3,412,246
Patented Nov. 19, 1968

3,412,246
SPARK IMAGING DEVICE FOR MAPPING
DISTRIBUTION OF RADIATION
Norman H. Horwitz, 8741 Woodside Court, Oak Park, Mich. 48237, and James E. Lofstrom, 265 Williams, Grosse Pointe, Mich. 48236
Filed Apr. 2, 1965, Ser. No. 445,127
18 Claims. (Cl. 250—83.6)

ABSTRACT OF THE DISCLOSURE

This disclosure relates to a spark imaging device for mapping distribution of radiation, including a plate-like photosensitive cathode for subjection to the radiation to be imaged, a plate-like light-transmitting anode spaced from the cathode on the side thereof opposite the source of the radiation to be imaged and through which scintillation activity between the electrodes may readily be observed, and a gas medium capable of supporting a spark between the electrodes. A source of current potential is applied across the electrodes for impressing a voltage therebetween, above the sparking potential of the gas medium, to support a discharge avalanche in the gas upon secondary emission of photoelectrons from the cathode generated by the impinging radiation. And a collimating means is provided between the source of radiation and the cathode which absorbs radiation not generally perpendicular to the plane of the cathode.

---

This invention relates to a radiation imaging device, which permits the direct visualization and recording of the distribution of radioactive material from a radiating source, such as a human organ. This device may be used in the determination of body organ functions, and provides a means of detecting diseased organs.

A prior art device presently in use employs a technique we helped develop called scintillation scanning. This technique employs a rather complex detector which is shifted to scan over the surface of interest a line at a time. A collimator is placed between the radiating source and the detector which absorbs stray radiation and limits the field of detection to a very small region of the radiating volume. The output of the detector activates a recording system in a series of pulses. The recording system includes means for producing a dot on a sheet of paper or photographic film for each pulse produced by the scintillation counter. The recorder and the detector are synchronized so that the activity of the radiation source and the number of dots per unit of length on the recording correspond. Because the scintillation detector can collect data over a limited area of the emitting surface at any one time, the scanning is done in rows, much like a typewriter, and the recording period ranges from twenty minutes to one hour, depending on the size, area, and intensity of radiation. Further, if the distribution of radiation is undergoing change during the scanning process, the data will have a temporal lag between the initial and final parts of the scan.

The three major disadvantages of the scintillation scanner are: the long time interval required to obtain the radiation distribtuion data; the inability to obtain temporal information about the radiation distribution; and the limitation on resolution made by the spacing of scanning rows, and the collimator.

Other systems and techniques have been developed to overcome the disadvantages of the scintillation scanning device. Among these are the gamma ray cameras and autofluoroscopes. In these systems the radiating surface is viewed through a multi-channel collimator. A gamma ray emitted from the radiating surface penetrates the collimator and is stopped in a scintillator, a flash of light is produced at the site where the interaction takes place. The flash of light is viewed by a bank of photo-multiplier tubes. The signals received from the photo-multiplier tubes are compared in a complex comparison network which determines the point from which the radiation occurred. The comparison network feeds the data to an oscilloscope screen, which provides a visualization of the radiating source. A Polaroid camera may also be used to make a record of the oscilloscope display. The system may require as many as nineteen photo-multiplier tubes, which, together with the complex electronic system, results in a large cost. Another disadvantage of the system is its required size due to the great amount of shielding required for the detector. This limits its use. The complex electrical system must also be continually adjusted by a trained technician.

Another system was developed by Kurt F. Lyon and disclosed in U.S. Patent No. 2,692,948. The Lyon device is not designed to meet the needs of this invention, because of its bulk, and its inherent limitation on resolution to the needle-like electrodes.

In our invention the gamma rays from the radiating source causes localized break-down of an inert gas contained between a pair of electrodes, which are held at an electric potential slightly above the sparking potential for the inert gas. The anode is transparent, so that the visual light caused by the localized break-down may be observed and recorded. Gamma ray photons pass through a collimator and impinge upon the cathode, which is a metal plate or a glass plate coated with metal, to produce secondary electrons. These electrons project into the inert gas between the electrodes, where they trigger a Townsend avalanche. The Townsend avalanche produces a visible spark observable through the anode which is localized to the region of interaction. A fluorescent screen may be used to aid in visual retention, and a camera may be used to record the activity. In our invention high sensitivity has been obtained in a simple low cost machine.

An object of this invention is to produce a radiation imaging device which is sensitive enough to permit radiation imaging in less than one minute, to allow time lapse sequencing of organ radiation uptake.

Another object of this invention is to provide a radiation imaging device which is light and compact enough, including its collimator, to be used by small clinics.

Another object of this invention is to provide a radiation imaging device with a greater sensitivity to allow imaging of body organs with a greatly reduced amount of radioactive material.

Another object of this invention is to provide a radiation imaging device which is not limited in resolution area.

Another object of this invention is to provide a radiation imaging device which is simpler in construction than previous devices, to reduce the cost, so that body organ isotope uptake studies, and radioactive iodine scanning, can be performed at facilities unable to afford the more complex systems.

Other objects, advantages, and meritorious features of this invention will more fully appear from the following specification, claims, and accompanying drawings, wherein:

FIG. 2 is a schematic illustration of our invention;

FIG. 3 is a cross-sectional view of an embodiment of our invention;

FIG. 4 is a cross-sectional end view of FIG. 3 in the direction of view arrows 4—4;

FIG. 5 shows an alternate form of the cathode including an amplification means; and FIG. 6 shows the embodiment of FIG. 2 attached to a simultaneous viewing and recording camera.

Figure 1:
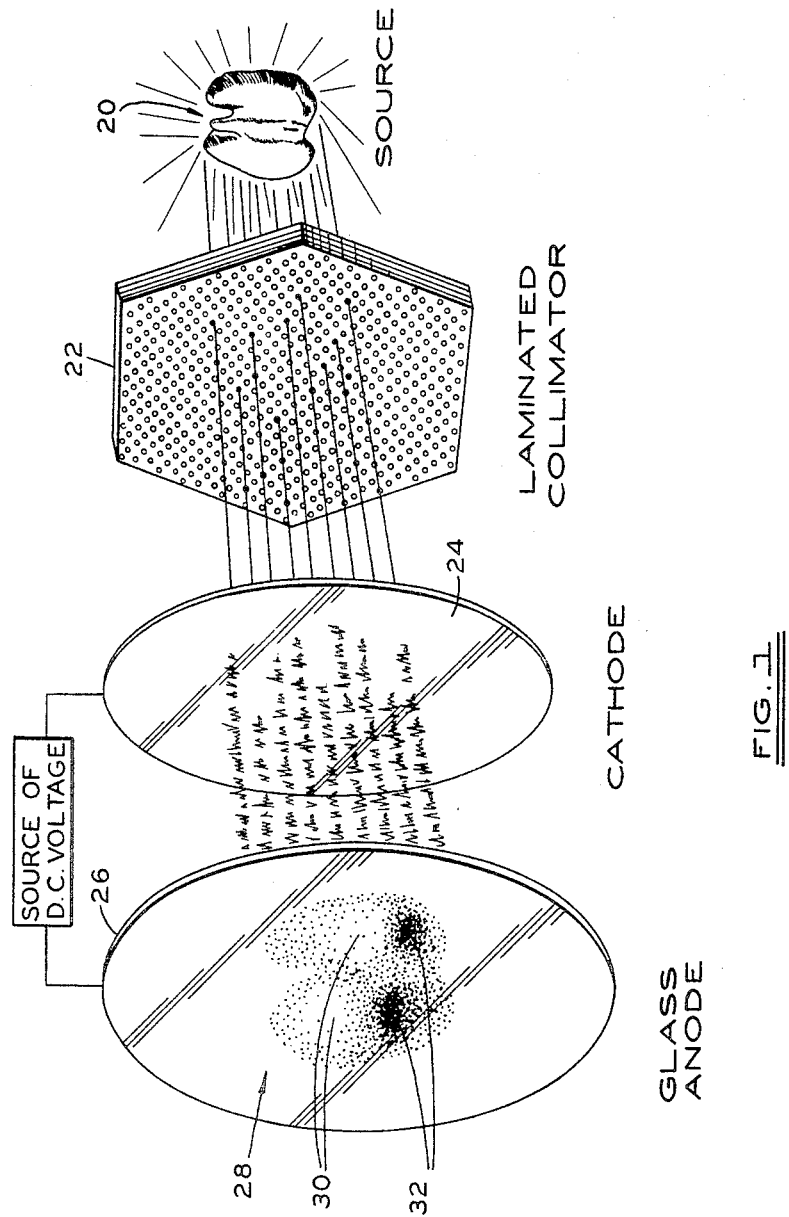
FIG. 1 is an exploded view of the principal elements of our invention.

Referring now to FIG. 1, the radiating source shown is a thyroid gland, indicated generally at 20. The thyroid gland has been made radioactive in a radio isotope "uptake study," in which the patient is given radioactive iodine, which the thyroid gland absorbs. A normal thyroid gland will absorb iodine uniformly, and a deviation from this uniform absorption may indicate a diseased gland. Similar studies are run on other organs. It should be noted, that our invention is especially suited, though not restricted to, the study of the thyroid, because the radiation imaging device of this invention may be made compact enough to be conveniently placed in the restricted area of the neck.

The gamma rays or photons emitted by the source linearly scatter in all directions. By absorbing the rays which are not perpendicular to the discharge chamber, it is possible to determine the source of the rays. The function of the collimator 22 is to absorb the stray, and hence unwanted radiation, so that all of the radiation impinging upon the photosensitive cathode 24 is substantially perpendicular to the cathode.

The collimator of this embodiment is constructed from accurately perforated sheets of lead, secured into a grid structure, with alternate rows of perforations staggered. The sheets illustrated are $1/16$ inch thick, having $1/8$ inch circular perforations on $3/16$ inch centers. We have found that a highly satisfactory collimator may be constructed using perforated lead sheets for two reasons; perforated lead sheets are commercially available at a relatively small cost, and the thickness of the collimator may be varied, by adding or subtracting sheets. The resolution of the radiation imaging device may be varied by varying the thickness of the collimator, as a thicker collimator absorbs more radiation than a thinner collimator. This technique is an improvement over previous methods of making collimators, which required accurate drilling of thicker lead plates, or individual aligning and securing of collimator tubes.

The gamma rays emitted from the radiating source which are substantially perpendicular to the cathode 24, pass through the collimator 22, and impinge upon the photosensitive cathode 24 to produce secondary photo-electrons between the cathode 24, and the target anode 26. A photosensitive cathode which has produced satisfactory results in this embodiment is a glass plate having a thin deposit of silver applied similar to the method of applying conductive bushbars to electrically conductive glass. However, a thin sheet of aluminum or magnesium has also been found satisfactory for the cathode. The cathode must include a photosensitive material to produce the secondary photo-electrons in the gas medium, between the cathode and the anode. It must be a good conductor, to provide an electric potential across the anode and the cathode. It must be thick enough to assure interaction with the impinging gamma radiation, and thin enough to allow escape of secondary photoelectrons on excitation by the radiation. And, it should be opaque to improve the visualization of scintillations produced between the anode and the cathode. A film of silver, on the order of five to ten ten-thousandths (0.0005 to 0.0010) of an inch, deposited on a glass plate, has been found to meet all these requirements.

A scintillation medium, such as argon or neon, with a quenching agent, such as iodine vapor, to prevent spurious electron discharges, has been found to provide excellent scintillation from the secondary photo-electrons. However, other well-known scintillation mediums may prove satisfactory. The inert gas is provided between the cathode 24 and the anode 26, and an electric potential is applied across the electrodes at or slightly above the sparking potential for the inert gas. Secondary photo-electrons discharged from the cathode 24 into the inert gas phosphor triggers a Townsend avalanche within the phosphor, which produces a scintillation, or a visible spark limited to the region of interaction.

The voltage impressed across the electrodes induces an electric field within the gas medium, with parallel lines of force, perpendicular to the electrodes. A Townsend avalanche, which is a cascade and multiplication of ions produced by the photo-electron, will travel the path of least resistance to the target anode, which are the lines of force of the electric field. An end on view of a scintillation, through the anode, appears a a dot, limited to the area of interaction.

The target anode illustrated is a transparent electrically conductive glass plate which may be of a character similar to that described in U.S. Patent No. 2,695,247, issued Nov. 23, 1954, Example 1. The periphery of the anode is coated with a conductor such as indium solder or silver, to provide electrical contact with the cathode. The surface conductor, which may be stannous oxide, can be applied as described in the above-mentioned patent on the surface of the anode. Electrically conductive glass is preferred for two reasons; because of its inherent resistance of 50 to 10,000 ohms per square of anode, which prevent spurious electrical discharges, and its transparency, which allows visualization and recording of the scintillation activity between the electrodes. A surface resistance of 50 to 300 ohms per square of anode is preferred.

The electrodes of this system function similar to an electronic capacitor, and the scintillations are a controlled leakage across the capacitor, which causes a momentary break-down in the path of the Townsend avalanche. The charge on the anode will tend to drain along this breakdown, to cause a sustained discharge across the capacitor, and a complete drain-off of the anode charge. The surface resistance of the anode, described above, will limit this drain-off of anode charge, to a small area, and provide an optimum scintillation. Further quenching means may also be provided which are described below.

An example of the image produced by a radiating source is shown for simplicity of representation at 28 on the anode 26. The areas of lesser activity indicated at 30, indicate a nodule or area within the organ, which is not taking up the radioactive material and therefore not properly functioning. The areas 32 of excess activity also indicate abnormal functioning. The resolution of these areas of abnormal activity is found to be as good, or better, than more complex and expensive systems.

FIG. 2 is a schematic illustration of an embodiment of our invention, which shows more detail of the radiation imaging device's construction. The reference characters used in FIG. 1, are used in FIG. 2 to indicate the same elements. Thus, 20 is the radiating source, 22 is the collimator, 24 is the cathode, and 26 is the transparent anode. As previously stated, an inert gas phosphor such as argon or neon is provided between the cathode 24, and the anode 26, which is contained within the discharge chamber 40. The electrical potential applied across the electrodes 24 and 26 will depend upon the inert gas used. An operating voltage of approximately 1500 volts has been found suitable for neon, and 2300 volts has been found suitable for argon, for the electrode spacing herein described. Argon is preferred because of its better visualization properties.

A fluorescent screen 42 may be provided either in the form of a fluorescent layer on the inside of the chamber, as at 42, or on the back surface of the anode 26, as at 27. Such a screen will provide a longer visualization decay time, which permits better visualization. A camera, indicated generally at 46, may be provided which is focused in the gas medium between the anode 26 and the cathode 24 to record the distribution of radiation from the radiating source. The camera observes the discharge end on, and hence the discharge appears as a dot in the photographic image. Satisfactory results have been obtained with a Polaroid Land camera using Polaroid ASA 3000 film, at a lens stop of f8.

FIGS. 3 and 4 illustrate one embodiment of our invention, showing the construction details. FIG. 3 shows the laminated collimator 22, the silver-coated glass cathode 24, and the transparent glass anode 26. The inert gas is contained within the discharge chamber 40, and communicates between the anode 26 and the cathode 24. The laminated collimator 22 is secured to the body 50 by a screw thimble nut 52 which seals the forward end of the body. The body 50 may be constructed of any suitable material, such as the metal construction shown, or the anode, cathode, and body may be constructed from a single glass envelope, similar to the construction of a television tube.

The inert gas contained within the discharge chamber 40 must be free of oxygen and other contaminants to obtain optimum scintillation. The presence of iodine vapor in the discharge chamber tends to prevent spurious and unwanted discharge between the electrodes. A technique which we have found satisfactory to charge the chamber, when the cathode is relatively thin and therefore subject to collapse, is to simultaneously draw a vacuum on the chamber 40 through the port 53 and the valve 54, while drawing the same vacuum on the outside of the cathode 24 with a pumping cap, not shown. When the pressure has been reduced to about 1 micron, a few milligrams of iodine, dissolved in ethyl or methyl alcohol, is added to the discharge chamber 40. The chamber is then back-filled with inert gas, and air is allowed into the pumping cap outside the cathode 24. The pumping cap may be attached in the same way that the screw thimble nut 52 is shown attached.

A well-regulated power source, shown schematically in FIG. 1, of 0 to 2500 volts D.C., is connected across the electrodes 24 and 26. One side of the circuit is grounded to the casing as at 57, see FIG. 3, and the cathode is grounded to the casing. The other side of the circuit is connected to the anode by the electrical connector 56 and wire 55. A ballast resistor 43, see FIG. 2, is placed in series with the power source and anode 26 to limit the energy dissipation in the discharge. A range of suitable values for the ballast resistor is 10 to 70 megohms. In lieu of the high resistance ballast 43, an electronic quenching system may be used, as will be understood by those skilled in the art, which immediately after occurrence of a scintillation will switch out the high resistance ballast and switch in a low resistance charging path. This results in a substantial reduction of the "dead time" of the device. The electrodes 24 and 26 should be parallel within 0.001 of an inch to provide a uniform electric field between the plates, or a spurious sparking will result. Optically ground glass spacing members 58 maintain a spacing between the electrodes of 0.100 inch to 0.125 inch. The glass spacing members 58 insulate the electrodes, one from another, and allow the inert gas to communicate between the electrodes and the chamber 40.

The aft end of the discharge chamber 50 is sealed with a glass viewing plate 60, by an O-ring 62. The body 50 may be attached by any means to the structure of the camera-supporting means, generally indicated at 64. This embodiment shows a flange 66 on the body member 64 which is attached to the support 64 by a plurality of screws 68.

FIG. 5 shows a cathodic system which is more sensitive and hence more efficient than the silver glass cathode 24 of FIG. 2. In this system the gamma rays emitted from the radiating source are converted by an interaction phosphor layer 100, to light photons which impinge upon light photosensitive layer 104, causing the emission of secondary electrons. The system enables the use of a very thin light photosensitive layer which is itself more efficient than the silver cathode 24 in emitting photo-electrons. The increased sensitivity of the system arises from the fact that the gamma rays are more efficiently converted to photo-electrons by first impinging upon a relatively thick phosphor 100, which provides a highly efficient medium converting the gamma radiation to a lower energy light photon. These light photons are more readily converted by a thin cathode film.

In the cathodic system of FIG. 5, gamma rays from the radiating source, shown as 20 in FIG. 2, impinge upon a crystalline phosphor 100, such as silver activated zinc sulphide, or zinc cadminum sulphide. The phosphor 100, is deposited on a transparent plate 102, and emits light photons when bombarded with gamma radiation. The light photons bombard the light photosensitive film cathode 104, to emit secondary electrons into the inert gas medium, contained in the chamber 40, which triggers a Townsend avalanche as described above. The light photosensitive cathodic film of this embodiment may be, but is not limited to, a molecular layer of cesium-antimony or cesium-antimony oxide. The cathodic film may be much thinner than the silver cathode of FIGS. 1 and 2, and still assure interaction with the photons emitted by the phosphor, because of the lower energy of a light photon. The optimum thickness of a few molecules provides a much greater sensitivity. This cathodic film must also be conductive to provide an electric potential across the inert gas medium.

A light photon produced in the crystalline phosphor 100 readily escapes the crystalline structure of the phosphor to impinge upon the thin light photosensitive cathode 104. The silver-coated glass cathode 24, of FIG. 2, is less sensitive to gamma radiation, because the secondary photo-electrons have a greater tendency to become trapped within the thicker silver film, than do the light photons in the crystalline phosphor 100, or the photo-electrons in the molecular cathodic film 104. This structure, therefore, amplifies the sensitivity of the system.

FIG. 6 shows the assembled system together with a simultaneous viewing and recording camera 72. The radiation from the source 20 is received by the radiation imaging device, generally indicated at 70. The recording camera, generally indicated as 72, is focused as shown in FIG. 2, in the gas medium between the anode and the cathode. A half-silvered mirror 74 projects the radiation image for visualization to the viewing hood 76. The recording camera is operated by a shutter control 78. The camera system 72 is attached to the radiation imaging device 70 by the mounting latch 80. The simultaneous viewing and recording camera system illustrated is commercially available from Tektronix Incorporated.

What is claimed is:

1. A spark imaging device for mapping distribution of radiation comprising: a plate-like photosensitive cathode for subjection to the radiation to be imaged, a plate-like light-transmitting anode spaced from the cathode on the side thereof opposite the source of the radiation to be imaged and through which scintillation activity between the electrodes may be readily observed, a gas medium capable of supporting a spark between the electrodes, a source of current potential connected across the electrodes for impressing a voltage therebetween above the sparking potential of the gas medium to support a discharge avalanche in the gas medium upon secondary emisson of photoelectrons from the cathode generated by the impinging radiation, and a collimating means absorbing radiation not generally perpendicular to the plane of the cathode, said anode having an electrical resistivity preventing uncontrolled discharge of the anode potential through the path of the discharge avalanche.

2. The invention of claim 1 in which said photosensitive cathode is a silver deposit on the surface of a glass plate, thick enough to assure interaction with the impinging radiation, and thin enough to allow the escape of secondary photo-electrons on excitation by said impinging radiation.

3. The invention of claim 1 in which said light transmitting anode is a transparent electrically-conductive plate.

4. The invention of claim 1 in which said gas medium is an inert gas selected from the group consisting of argon and neon.

5. The invention of claim 1 including a phosphor between the source of the radiation to be imaged and said cathode which emits photons on excitation by said radiation to impinge upon said cathode.

6. A spark imaging device for mapping distribution radiation comprising: a sealed discharge chamber having in spaced relation a photosensitive cathode for subjection to the radiation to be imaged, and a plate-like light-transmitting anode with a gas medium capable of supporting a spark therebetween, an electric field maintained across said medium sufficient to support a discharge avalanche within the medium upon emission of photo-electrons from said cathode into said medium, and an electrical discharge quenching means to prevent a sustained discharge of potential between said anode and said cathode.

7. The invention of claim 6 wherein a portion of said discharge quenching means is the electrical resistance of said anode which limits the drain-off of anode potential through the path of the discharge avalanche.

8. The invention of claim 6 in which a fluorescent coating is provided on said light-transmitting anode on the surface opposite said cathode to increase the visualization time of the scintillations occurring in said gas medum.

9. The invention of claim 1 in which said visible scintillations are recorded by a camera focused in said medium through said light-transmitting anode to record and integrate the individual sparks.

10. A spark imaging device for mapping distribution radiation comprising; a phosphor for subjection to the radiation to be imaged, a plate-like photosensitive cathode on the side of said phosphor opposite the source of said radiation, a plate-like transparent anode parallel to and spaced from said cathode on the side opposite to said phosphor, a gas medium between said electrodes, an electric field maintained across said inert gas medium sufficient to support a discharge avalance within said gas medium upon secondary emission of photo-electrons from said cathode, and discharge quenching means which prevents an uncontrolled discharge of the anode potential through the path of the discharge avalanche.

11. The invention of claim 10 in which said phosphor for subjection to the radiation to be imaged is a crystalline material selected from the group consisting of silver activated zinc sulphide and zinc cadmium sulphide.

12. The invention of claim 10 in which said photosensitive cathode is a molecular film selected from the group consisting of cesium-antimony and cesium-antimony oxide.

13. The invention of claim 10 in which said phosphor and said cathode are films deposited on opposite sides of a glass plate.

14. A spark imaging device mapping distribution of radiation comprising; a sealed discharge chamber having therein, a plate-like photosensitive cathode, a plate-like transparent conductive anode parallel to and spaced from the cathode on the side thereof opposite the source of the radiation to be imaged and through which scintillation activity between the electrodes may be readily observed, a lead collimator between said cathode and the source of said radiation having a series of perforations with their axes perpendicular to said cathode to admit only the radiation which is substantially perpendicular to the electrodes to impinge upon said cathode, a gas medium contained within said chamber and communicating between said electrodes, a source of current potential impressed across the electrodes above the sparking potential of said gas medium to impress an electric field across the medium sufficient to support a discharge avalanche within said medium upon emission of secondary photo-electrons from the cathode on excitation by impinging radiation, and said anode having an electrical resistivity quenching discharge of the anode potential through the path of the avalanche.

15. The invention of claim 14 in which said collimator comprises a laminate of perforated lead sheets detachably aligned to allow variance of the thickness of the collimator.

16. The invention of claim 14 in which the end of said discharge chamber opposite said collimator is sealed with a light conductive viewing plate having a fluorescent coating on the surface nearest said collimator to increase the visualization time of the scintillations in said gas medium.

17. The invention of claim 14 in which a ballast resistor is placed in series with said source of direct current potential to limit the energy dissipation by said anode during discharge.

18. In a spark detecting device: a phosphor for subjection to the radiation to be detected, a photo-sensitive cathode on the side of said phosphor opposite the source of the radiation to be detected, an anode spaced from said cathode on the side opposite to said medium, a gas phosphor between the electrodes, an electric field maintained within said gas medium impressed across said electrodes sufficient to support a discharge avalanche within said gas medium upon secondary emission of photo-electrons from said cathode.

References Cited

UNITED STATES PATENTS

| | | | |
|---|---|---|---|
| 2,534,922 | 12/1950 | Marshall | 250—83.6 |
| 2,534,932 | 12/1950 | Sun | 250—83.6 |
| 2,942,109 | 6/1960 | Bell et al. | 250—71.5 |
| 3,163,765 | 12/1964 | Niklas. | |
| 3,235,737 | 2/1966 | Niklas | 250—83.3 X |

OTHER REFERENCES

MacIntyre et al.: Techniques for the Visualization of Internal Organs by an Automatic Radioisotope Scanning System, Apr. 26, 1957, pp. 193–206.

RALPH G. NILSON, *Primary Examiner.*

A. B. CROFT, *Assistant Examiner.*